United States Patent
Obaidi

(10) Patent No.: US 12,077,061 B2
(45) Date of Patent: Sep. 3, 2024

(54) NETWORK-BASED CONTROL OF INDUCTION CHARGING OF ELECTRICAL VEHICLES

(71) Applicant: T-Mobile USA, Inc., Bellevue, WA (US)

(72) Inventor: Ahmad Arash Obaidi, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 521 days.

(21) Appl. No.: 16/823,179

(22) Filed: Mar. 18, 2020

(65) Prior Publication Data

US 2021/0291695 A1 Sep. 23, 2021

(51) Int. Cl.
| | |
|---|---|
| B60L 53/68 | (2019.01) |
| B60L 53/30 | (2019.01) |
| B60L 53/66 | (2019.01) |
| B60L 58/12 | (2019.01) |
| G08G 1/127 | (2006.01) |

(52) U.S. Cl.
CPC ............ B60L 53/68 (2019.02); B60L 53/305 (2019.02); B60L 53/665 (2019.02); B60L 58/12 (2019.02); B60L 2260/52 (2013.01); G08G 1/127 (2013.01)

(58) Field of Classification Search
CPC .......... B60L 53/62; B60L 53/63; B60L 53/64; B60L 53/65; B60L 53/66; B60L 53/67; B60L 53/68; B60L 58/10; B60L 58/12; B60L 58/13; B60L 58/14; B60L 2260/52; G08G 1/123; G08G 1/127
See application file for complete search history.

(56) References Cited

U.S. PATENT DOCUMENTS

2015/0149221 A1* 5/2015 Tremblay ............... G06Q 50/12
320/109
2019/0039470 A1* 2/2019 Moghe .................... B60L 53/32
(Continued)

FOREIGN PATENT DOCUMENTS

| JP | 2006166570 A | * | 6/2006 |
| WO | 2017051972 A1 | | 3/2017 |

OTHER PUBLICATIONS

Translation of JP-2006166570-A.*
(Continued)

Primary Examiner — Russell Frejd
Assistant Examiner — Sara J Lewandroski
(74) Attorney, Agent, or Firm — Lee & Hayes, P.C.

(57) ABSTRACT

A wireless carrier network is used to access data indicative of geographic locations and charging capabilities of a plurality of devices embedded in a roadway infrastructure configured to inductively charge electrical vehicles while the electrical vehicles are traversing the roadway infrastructure. Location tracking information is determined for an electrical vehicle and a probable travel path of the electrical vehicle on the roadway infrastructure. Charging settings for conditions during which the electrical vehicle should be charged is determined. A charging plan for when and where to charge the electrical vehicles generated based on the charging settings, a charging model, the location tracking information for the electrical vehicle, and the charging capabilities of the plurality of embedded devices.

20 Claims, 6 Drawing Sheets

(56) References Cited

U.S. PATENT DOCUMENTS

2019/0113353 A1* 4/2019 Shimizu .............. B60W 50/082
2019/0226862 A1* 7/2019 Shaukat ................. G07C 5/008

OTHER PUBLICATIONS

Defloria F. et al., "Modeling and analysis of wireless 'Charge While Driving' operations for fully electric vehicles", SIDT Scientific Seminar 2013, pp. 161-174, Transportation Research Procedia 5 (2015).

* cited by examiner

NETWORK-BASED CONTROL OF INDUCTION CHARGING OF ELECTRICAL VEHICLES

BACKGROUND

Electric vehicles are becoming increasingly popular and cost effective. While the availability of stationary charging facilities is increasing, the time required by the charging process is still an issue. The concept of wireless power transfer, where energy is conducted from a power source to the vehicle battery without a direct electrical connection can help alleviate the issue. In particular, the implementation of an inductive charging infrastructure on roadways and highways can help ensure that electrical vehicles can have continuous access to power sources.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

With the widespread and continuous charging capability that can be provided by a wireless vehicle charging infrastructure, an effective charging process must be implemented to manage the cost as well as control the charging schedule. For example, frequent and low energy transfers while driving can lead to shortening of the battery life, and the cost of charging the battery must be maintained according to desired cost constraints.

The use of a computer-based network can facilitate the implementation of such charging processes. The present disclosure relates to a networked infrastructure that can provide a network-based control framework for vehicle charging on an inductive network. Various systems and methods are described for using networks, such as 5G networks, to facilitate the charging of electrical vehicles while driving. In a scenario where roads incorporate embedded wiring and devices for induction charging of electrical vehicles, a wireless service provider may use the network to control the charging of vehicles as the vehicles travel on these roads. The driver's mobile device can be used to manage settings for when to charge the vehicle, and a software agent on the vehicle may interact with a network-based orchestrator to determine when and where to charge the vehicle based on a pricing model and vehicle location tracking information. The mobile device and/or the orchestrator may communicate with road sensors to effect the charging plan.

In an embodiment, the networked infrastructure can be used to determine the location of electrical vehicles that may be charged. In some embodiments, an application on a mobile device that communicates on the networked infrastructure may be configured to manage user preferences and determine when to charge the vehicle, how long to charge the vehicle, and the billing rate at which the vehicle may be charged. In some embodiments, an agent on the vehicle may be configured to communicate with the networked infrastructure and/or communicate with the application on the mobile device. The vehicle may provide information as to the remaining capacity, the vehicle identification information, and other information pertaining to charging the vehicle. The application on the mobile device may be used to select a preferred pricing model, which can be based on location and billing rates. The networked infrastructure may communicate with the vehicle and/or the mobile device to provide guidance with data indicating when and where to charge. This may be determined based on the location of the vehicle, the current direction of travel, and an intended path of the vehicle. The networked infrastructure and/or the mobile device may communicate with embedded sensors and other devices to effect the charging plan for a particular vehicle.

Figure 1:
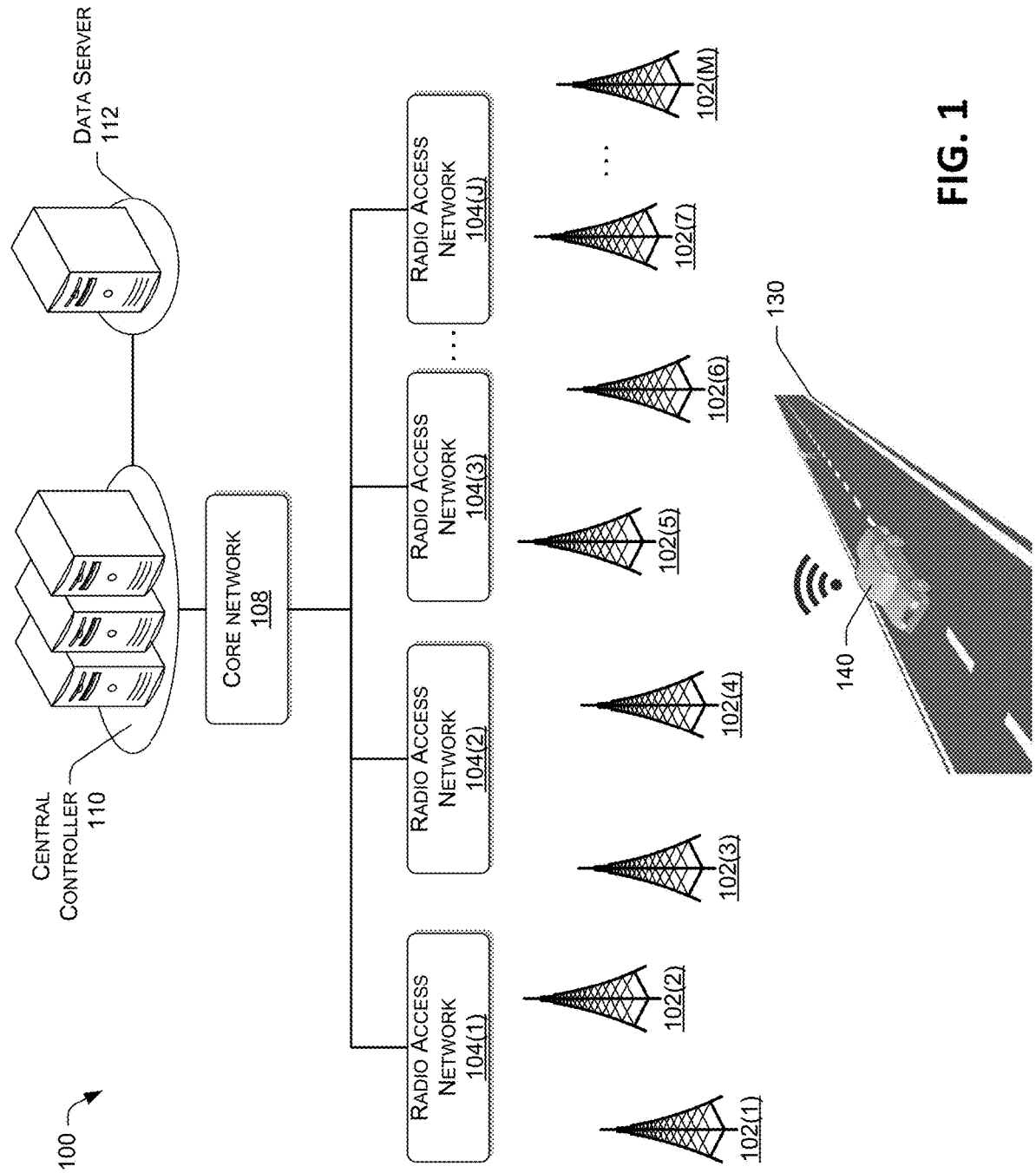
FIG. 1 illustrates an example architecture that implements an inductive charging environment.

FIG. 1 is an example architecture for implementing a wireless network system in accordance with the disclosed embodiments. Cell sites 102(1) to 102(N) may be configured and managed by a central controller 110. The cell sites may be configured individually or by clusters. The wireless telecommunication network 100 may include a plurality of hardware, software, and other infrastructure components that may be typical of a large wireless telecommunications provider. The cell sites 102(1) to 102(N) may be associated with a radio access networks (RANs) 104(1) to 104(N) used for mobile communications. The cell sites 102(1) to 102(N) may be located across different geographic areas to facilitate providing network access and connectivity to users in their corresponding geographic area. The cell sites 102(1) to 102(N) may be base stations, or other network end points (or possibly intermediary points) that exchange communications with user devices, such as mobile telecommunication devices, computing devices, or other devices that have wireless connectivity. The RANs 104 may be in communication with a core network 108.

In accordance with one or more embodiments, the wireless telecommunication network 100 may conform to Universal Mobile Telecommunications System (UMTS) technologies that employ UMTS Terrestrial Radio Access Network (UTRAN). In some instances, the UTRAN may share several components like a Circuit Switch (CS) and a Packet Switch (PS) core network with a GSM EDGE Radio Access Network (GERAN) (Global System for Mobile Communications (GSM), Enhanced Data rates for GSM Evolution (EDGE)). In various instances, a 4G long term evolution (4G/LTE) network that comprises Evolved UMTS Terrestrial Radio Access Network (EUTRAN) may be employed to transmit data for the telecommunications networks, besides UMTS or GSM. Thus, EUTRAN, UTRAN and GERAN networks (and other possible RANs) may coexist to process telecommunications traffic.

In some instances, communications may be handed off between EUTRAN, UTRAN and GERAN networks (or other networks) and still maintain a communication with a common core network, such as when a UE leaves a range of access (zone) of a EUTRAN and enters a range of access of a UTRAN or GERAN. Handoffs may also occur between different types of hardware (e.g., different manufacturers, versions, etc.,) for a same network type (e.g., EUTRAN, UTRAN, GERAN, etc.). For discussion purposes, it will be assumed that the architecture of FIG. 1 represents a 4G/LTE network that includes one or more evolved Node B's (eNodeB's), represented herein by cell sites 102(1) to 102(N), which provide an interface between a UE, such as a wireless handheld device that is configured to communicate over the radio access network 104(1) to 104(N) and the core network 108. Each eNodeB couples with the core network 108 via the mobility management entity (MME), represented by the intermediary layer 106, which is a control-node.

In accordance with one or more embodiments, other types of networks, RANs, and/or components (hardware and/or software) may be employed that enable telecommunications devices to communicate with the core network 108 to facilitate activities such as voice calling, messaging, emailing, accessing the Internet, or other types of data communications. For example, the wireless telecommunication network 100 may be, at least in part, a Wi-Fi based network, a Bluetooth network, or other type of wireless network.

The wireless telecommunication network 100 may include a central controller 110 to manage network performance optimizations for each cell cite and/or cell site clusters. In some embodiments, the central controller may include a self-organizing network or self-optimizing network (SON) controller. The central controller 110 may be in communication with one or more of the various components of the wireless telecommunication network 100, such as the core network 108, the one or more intermediaries 106, the RANs 104(1) to 104(N), and/or the cell sites 102(1) to 102(N). The central controller 110 may further be configured to send commands to adjust one or more antennas at cell sites 102(1) to 102(N). The antennas may comprise a single antenna, multiple antennas, an array of antennas, a phased antenna array, or the like. The antennas may be mounted to, or otherwise controllable by, an antenna positioner configured to change a beam direction from the antenna by altering a physical position of the antenna or altering the RF characteristics of the antenna.

In one embodiment, the wireless telecommunication network 100 includes a data server 112 that is configured to store and process information related to the management of a vehicle charging infrastructure. In some embodiments, the data server 112 provides some of the aforementioned information to the central controller 110.

With reference to FIG. 1, there is shown an example of an embedded electric vehicle charging system 130 that can be used to provide a charging service for an electric vehicle 140 in accordance with an embodiment. One or more electric vehicles 140 may be geographically distributed in an area such as a street, a city, or other geographic area. The electric vehicle 140 may be any vehicle that uses a battery to provide power to a drive train, such as an all-electric vehicle or a hybrid electric vehicle. The electric vehicle 140 may also include vans, trucks, motorcycles, or any other powered vehicle.

The electric vehicle 140 may include a battery that can store up to a certain maximum charge or capacity. The battery may be discharged at a rate that depends on a variety of factors, including speed, terrain, traffic, and driving behavior. The battery of the electric vehicle 140 can typically be charged from a plurality of charge sources such as an electrical outlet or a power storage device. The present disclosure provides a way to manage the wireless charging of electric vehicle 140. Wireless charging may involve the use of contact-less power transfer. The contact-less transfer may be inductive. For example, complementary inductive coils may be provided on the charge source and on the electric vehicle. When current flows in the charge source's coil, a magnetic field is created and induces a flow of current in the electric vehicle's coil. This induced current can be directed to the battery in the electric vehicle, allowing charge to build up in the battery. As another example, contact-less transfer may be implemented using microwave energy, where the roadway may be equipped with a charge source and a microwave emitter and the electric vehicle 140 may be equipped with a microwave receiver and converter. The transmitter may wirelessly transmit bursts of microwave energy to the receiver, which is converted into electrical energy at the electric vehicle and used to replenish the battery. Other wired wireless charge transfer mechanisms may also be implemented.

As discussed further below, in some embodiments, an induction charging management system may be implemented that allows the electric vehicle 140 to be charged under specified conditions, such as at specified times, at specified vehicle battery charge levels, at specified geographic areas, at specified billing rates, etc. Furthermore, the electric vehicle 140 may be charged based on such conditions without the driver having to initiate or otherwise control the charging process. This may be useful, for example, to avoid the vehicle battery from being depleted below a desired level, or to avoid the vehicle from having to be charged at an undesired billing rate.

Users of the electric vehicle 140 may establish a relationship with an entity that may be referred to as a charging service provider, which may be the same, or a different entity implements the induction charging management system. Specifically, users may subscribe to the charging service by establishing an account, as well as setting up various charging rules that may define conditions under which charging is to occur.

Figure 2:
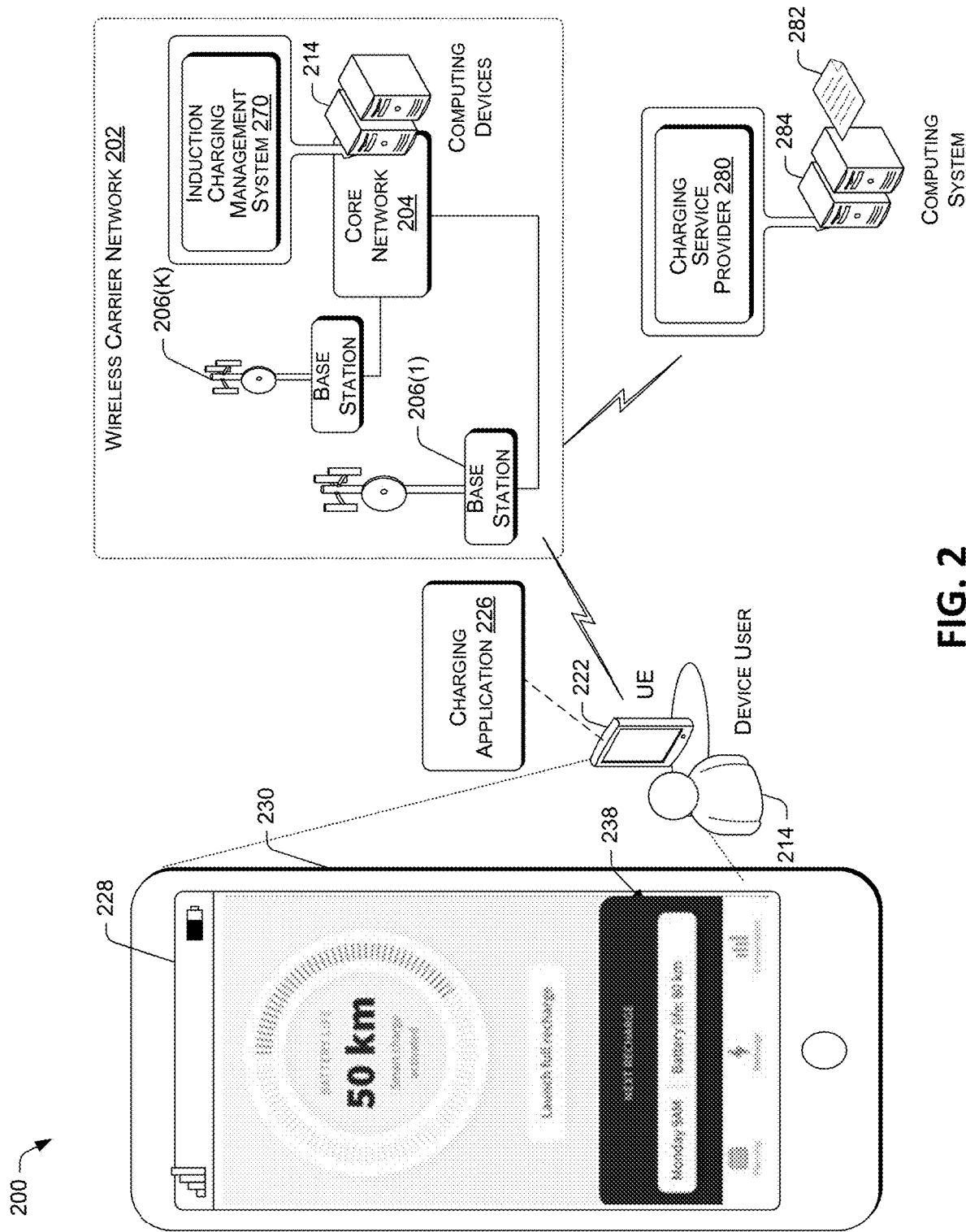
FIG. 2 is an example architecture for implementing an inductive charging system according to one embodiment.

Referring to FIG. 2, a charging service provider 280, via the induction charging management system 270, may manage user subscriptions and coordinate charging of the electric vehicle 140. In various example embodiments, the charging service provider 280 may be a car manufacturer, a utility, a company, or other organization. In an embodiment, the charging service provider 280 may implement various charging functions on a computing system 284.

In some embodiments, the charging service provider 280 may be accessible over networks such as the Internet. In some cases, the charging service provider 280 may be co-located with the wireless carrier network 202. The charging service provider 280 may also be distributed among a plurality of physical sites. Computing system 284 may store or have access to a vehicle database 282 that may include information pertaining to the electric vehicle 140 and other subscribing information.

Figure 3:
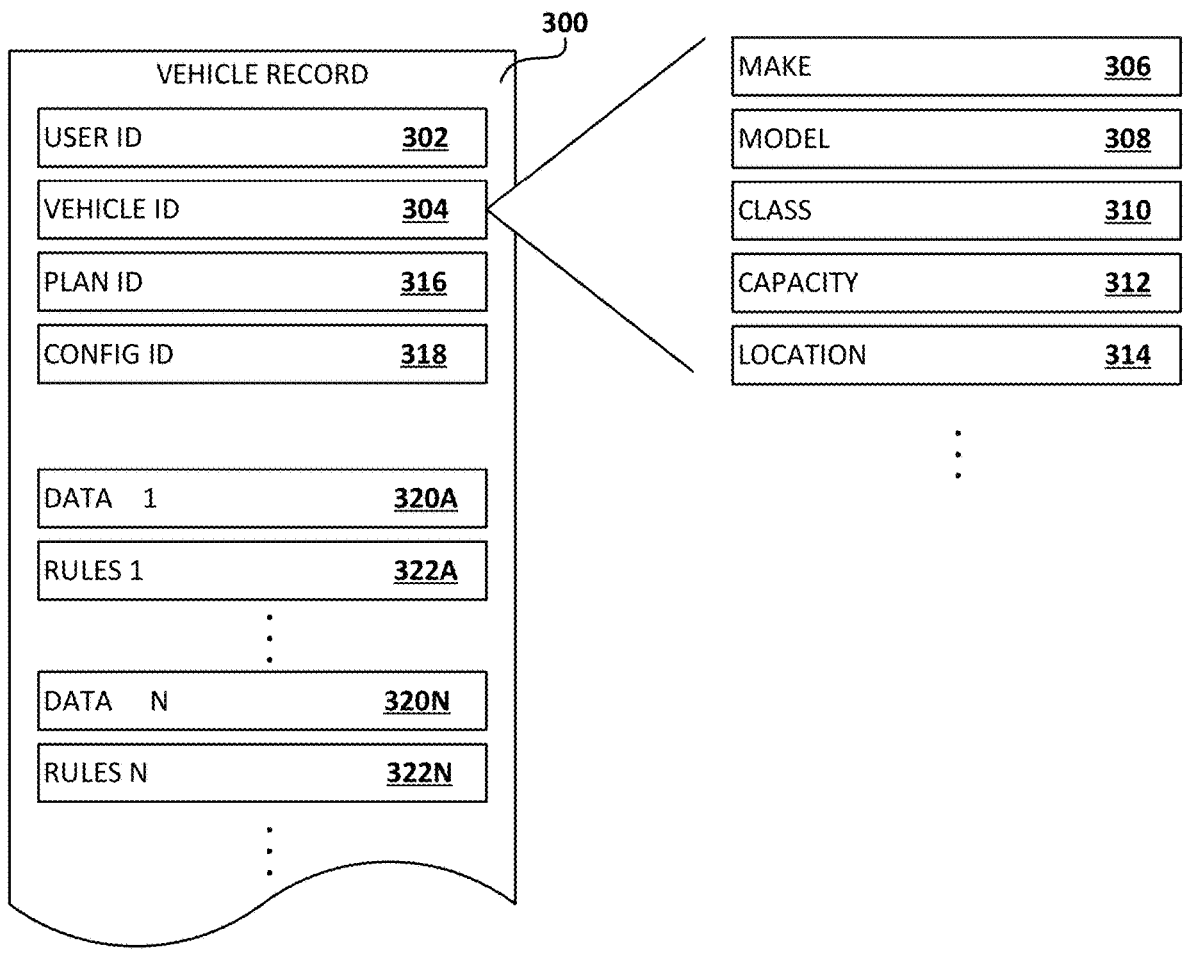
FIG. 3 illustrates a data structure for implementing an inductive charging system according to an embodiment.

In one example, and with reference to FIG. 3, the information in the vehicle database 282 may be stored as one or more records 300. Each record 300 may include account information identifying an electric vehicle and a user. It will be appreciated by one skilled in the art that the data structure shown in the figure may represent a data file, a database table, an object stored in a computer memory, a programmatic structure or any other data container commonly known in the art. Each data element included in the data structure may represent one or more fields in a data file, one or more columns of a database table, one or more attributes of an object, one or more variables of a programmatic structure or any other unit of data of a data structure commonly known in the art.

The vehicle record 300 may contain a user ID 302 identifying the user for whom the vehicle record 300 is created. This information may include identification information, credentials, and contact information. The user identified in the record 300 for a particular vehicle may be a person authorized to render decisions regarding charging of the particular vehicle and has established a relationship with the charging service provider 280. In some embodiments, the vehicle record 300 may additionally or alternatively contain various metadata describing the vehicle ID 304, make 306, model 308, class 310, charging capacity 312 including battery charge level information such as current and past charge levels of the vehicle's battery, location 314, registration information such as the vehicle identification number (VIN) and license plate of the particular electric vehicle, and the like. The vehicle record 300 may also contain a charging plan ID 316, configuration ID 318, and a number of data 320A . . . 320N and rules 322A . . . 322N that may include charging preferences associated with user ID 302 and vehicle ID 304. Location 314 may include vehicle location information such as current, last-known and/or past locations of the vehicle.

It will be appreciated that the vehicle record 300 may contain additional data elements beyond those shown in FIG. 3 and described above that are utilized by the charging service provider 280 and/or other systems and services.

Returning to FIG. 2, charging application 226 may implement one or more processes that interface with the user and allows the user 214 to access the charging service provider 280 and the vehicle database 282 in order to provide and obtain various information. The user 214 may interface via a communication device 222 to communicate with the charging service provider 280 over the wireless carrier network 202.

In one embodiment, the UE 222 may download charging application 226 from an app store. Upon activation of the charging application 226 on the device, the user may access certain features of the charging service provider 280. For example, the user may have access to maps and current location information, and may have the ability to enter information online. In addition, a data connection can be established via the wireless carrier network 202 with the charging service provider 280, which may execute a server-side application.

By interfacing with various front end processes, the user may be able to perform various actions such as setting up charging rules 322 (FIG. 3) for the vehicle(s) 140 that the user controls. In various embodiments, charging application 226 may enable customization of the charging rules 322. Various features may be provided to allow the user to enter preferences that define rules that determine conditions under which charging is to take place. In one embodiment, these conditions may be implemented using a machine learning system implemented by charging service provider 280. The machine learning system may use various conditions as input and generate recommendations or generate warnings if the entered settings conflict with one or more criteria. For example, if the user sets a charging rule to charge the battery when the vehicle's battery charge level has dropped below 0%", this may be determined to be an invalid rule, as it would result in the battery being completely depleted. If the user does not set up any charging rules 322, the charging service provider 280 may enter default charging rules for the associated vehicle. The default charging rules may be fixed for a vehicle make and model.

The user may use the charging application 226 to enter the various information outlined in FIG. 3, set up a new vehicle, remove an existing vehicle, enter payment information, etc. Other types of information that the user may enter may include, for example, make, model, color, a license plate number, time-based charging rules, such as schedule-based charging rules, battery-level-based charging rules, event-based charging rules, location-based charging rules, billing information, and the like.

In some embodiments, the user may provide permission for the location of the vehicle 140 to be provided to the charging service provider 280. For example, the charging application 226 may access the GPS information on the UE 222 to determine its location. The charging application 226 may also access mapping application data and other location-based data on the UE 222.

The charging application 226 may also send scheduled travel information to the charging service provider 280. For example, the user may access a calendar application on the UE 222 that indicates the location of upcoming meetings. In some embodiments, the charging application 226 may prompt the user to confirm upcoming charging activity. For example, if a condition to charge the vehicle may soon be met (e.g., within 2 hours), the charging application 226 may prompt the user to confirm (e.g., by clicking on a confirmation button on the user interface 228) whether the upcoming charging activity can be executed. Alternatively, the charging application 226 may determine a possible charging activity based on past user driving patterns and locations, and prompt the user to confirm the predicted charging activity.

Figure 4:
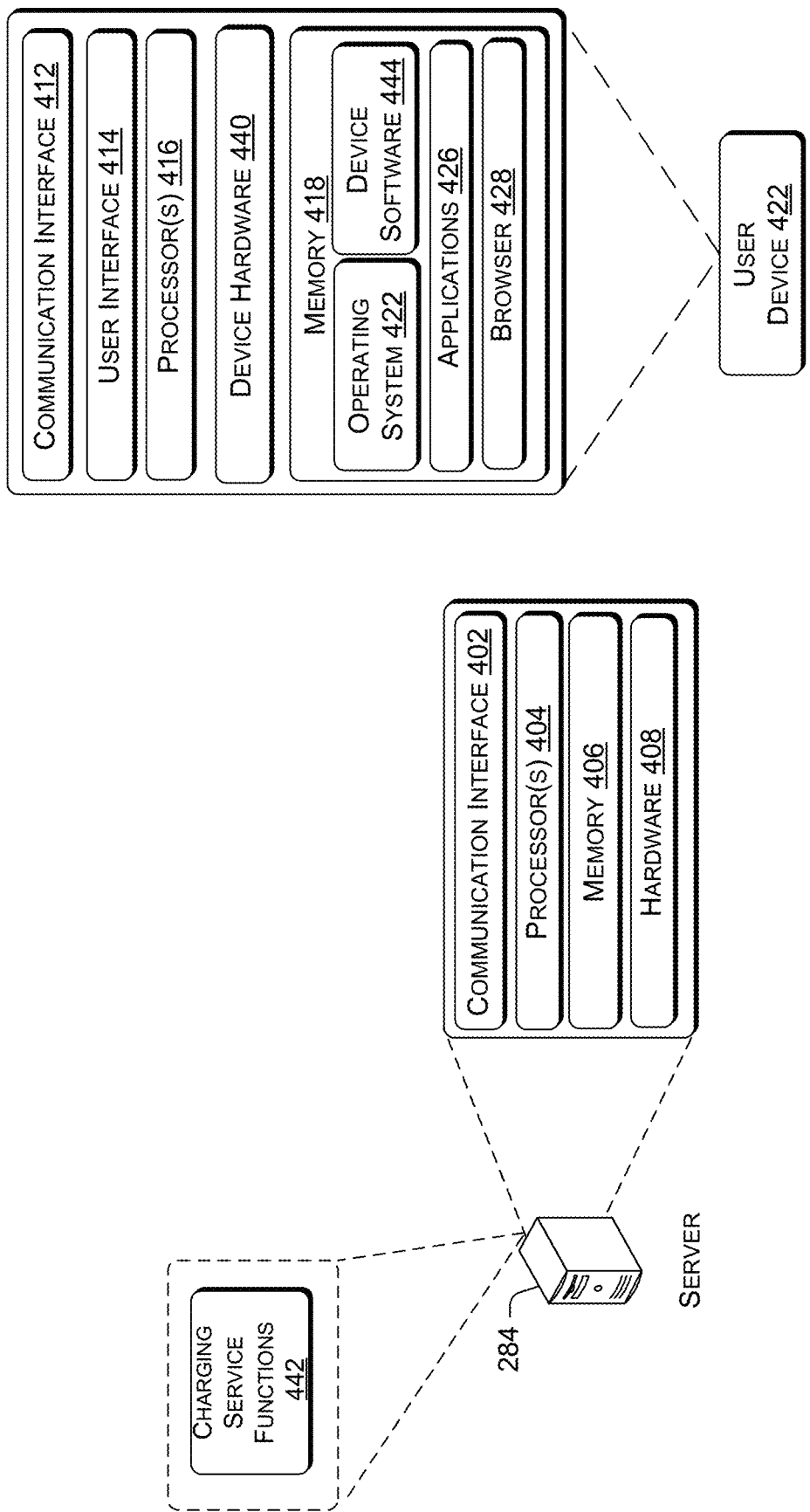
FIG. 4 is a block diagram showing various components of a server and a computing device that support an inductive charging system.

FIG. 4 is a block diagram showing various components of a server and a computing device that support the implementation of an inductive charging system. The server 284 may be implemented using one or more computing nodes. The computing nodes may include a communication interface 402, one or more processors 404, memory 406, and hardware 408. The communication interface 402 may include wireless and/or wired communication components that enable the server 284 to transmit data to and receive data from other networked devices. The hardware 408 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 406 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the server 284 or components thereof may be implemented using virtual computing devices in the form of virtual machines or software containers that are hosted in a computing cloud. The computing cloud may include a variety of disaggregated servers that provide virtual application server functionalities and virtual storage functionalities.

As shown in FIG. 4, user device 422 may be representative of the UE 222. The user device 422 may include a communication interface 412, a user interface 414, one or more processors 416, memory 418, and device hardware 240. The communication interface 412 may include wireless and/or wired communication components that enable the electronic device to transmit or receive voice or data communication via the wireless carrier network, as well as other telecommunication and/or data communication networks.

The user interface 414 may enable a user to provide input and receive output from the user device 422. The user interface 414 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 418 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 240 may include a modem that enables the user device 422 to perform telecommunication and data communication with a network. The device hardware 240 may further include signal converters, antennas, hardware decoders and encoders, graphics processors, a universal integrated circuit card (UICC) or an embedded UICC (eUICC), and/or the like that enable the user device 422 to execute applications and provide telecommunication and data communication functions.

The one or more processors 416 and the memory 418 of the user device 422 may implement an operating system 422, device software 424, one or more applications 426, and a web browser 428. Such software may include routines, program instructions, objects, and/or data structures that are executed by the processors 416 to perform particular tasks or implement particular abstract data types.

The operating system 422 may include components that enable the user device 422 to receive and transmit data via various interfaces (e.g., user controls, communication interface 412, and/or memory input/output devices). The operating system 422 may also process data using the one or more processors 416 to generate output based on input that is received via the user interface 414. For example, the operating system 422 may provide an execution environment for the execution of the applications 426 and the web browser 428. The operating system 422 may include a presentation component that presents the output (e.g., display the data on an electronic display, store the data in memory, transmit the data to another electronic device, etc.).

The operating system 422 may include an interface layer that enables applications to interface with the modem and/or the communication interface 412. The interface layer may comprise public APIs, private APIs, or a combination of both public APIs and private APIs. Additionally, the operating system 422 may include other components that perform various other functions generally associated with an operating system. The device software 424 may include software components that enable the user device to perform functions. For example, the device software 424 may include basic input/output system (BIOS), bootrom, or a bootloader that boots up the user device 422 and executes the operating system 422 following power-up of the device.

The applications 426 may include applications that provide utility, entertainment, and/or productivity functionalities to a user of the user device 422. For example, the applications 426 may include the charging application 226, telephony applications, electronic mail applications, remote desktop applications, navigation applications, office productivity applications, multimedia streaming applications, an online shopping application, and/or so forth. The web browser 428 may enable a user to access web pages provided by the server 284.

It should be appreciated that the subject matter described herein may be implemented as a computer-controlled apparatus, a computer process, a computing system, or as an article of manufacture such as a computer-readable storage medium. The various described services and functions may be remotely implemented such as on a server or may be implemented on one or more devices. Among many other benefits, the techniques shown herein improve efficiencies with respect to a wide range of computing resources. For instance, human interaction with a device may be improved, as the use of the techniques disclosed herein enable users to efficiently interact with and control induction charging systems. In addition, improved human interaction improves other computing resources such as processor and network resources, e.g., users can avoid repeated interactions and inquiries with charging systems and reduce a user's computer interaction, reduce the chances of an inadvertent input, reduce network traffic, and reduce computational cycles. Furthermore, instead of distributing data to users who may not use or need the data, data can be selectively distributed to relevant vehicles in a timely manner. Thus, data is distributed based on need, thus improving the efficiency of storage and network resources. Other technical effects, other than those mentioned herein, can also be realized from implementations of the technologies disclosed herein.

Figure 5:
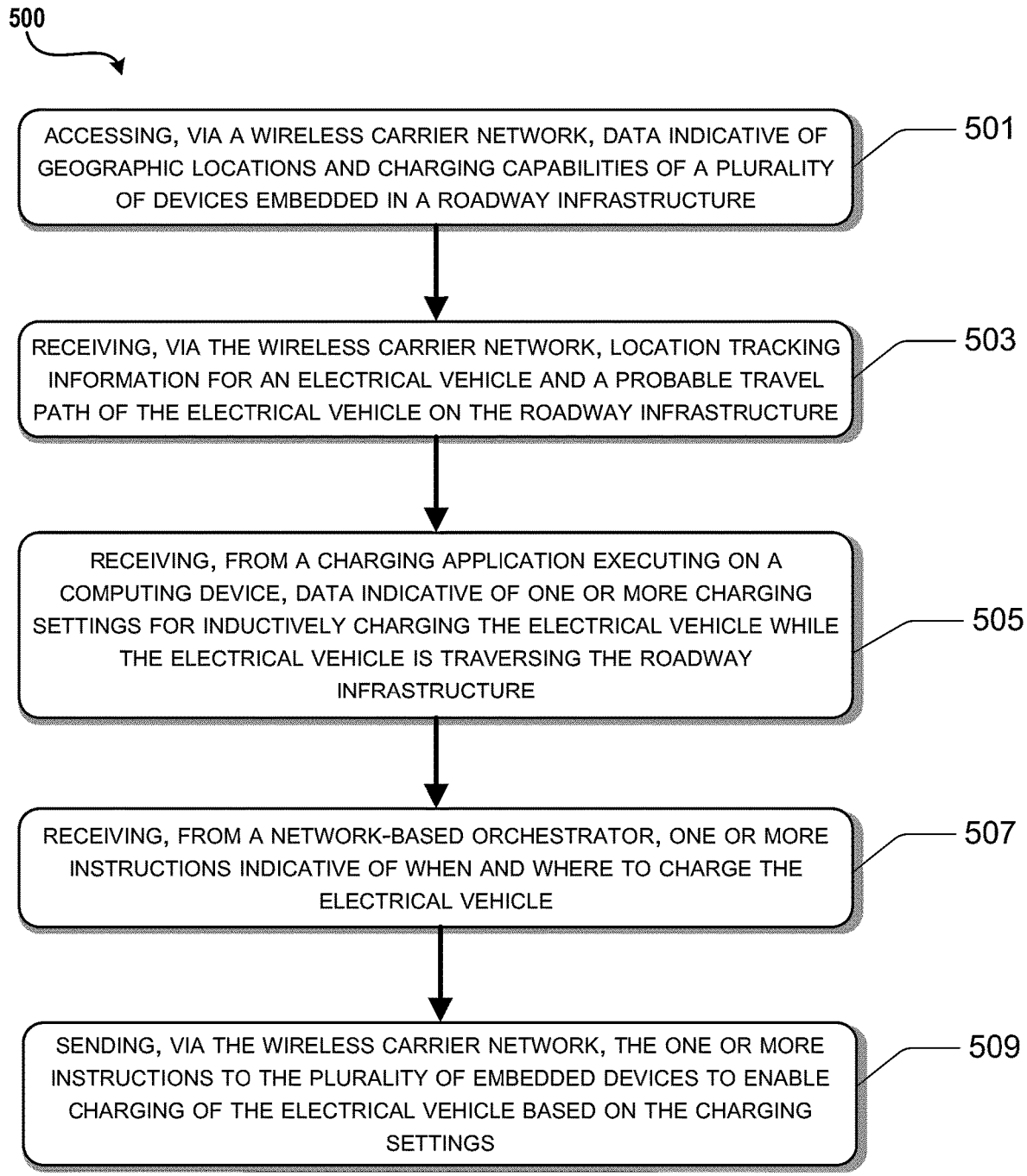
FIG. 5 illustrates a flow diagram of an example process for implementing an inductive charging system.
Figure 6:
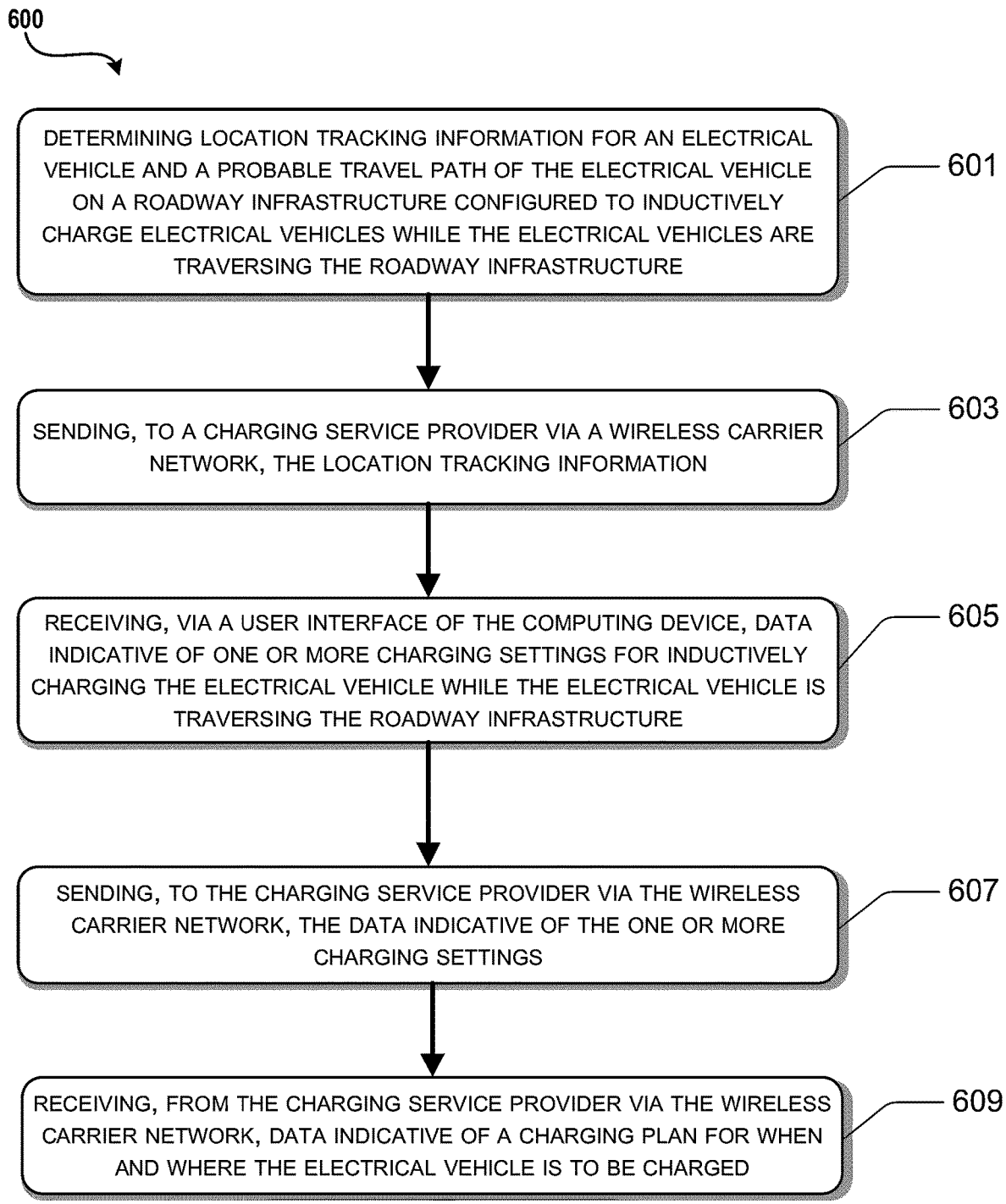
FIG. 6 is a flow diagram of an example process for an inductive charging system.

FIGS. 5-6 present illustrative processes 500-600 for implementing an induction charging system. Each of the processes 500-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types.

The order in which the operations are described for each process is not intended to be construed as a limitation, and any number of the described blocks can be combined in any order and/or in parallel to implement the process.

FIG. 5 illustrates an example operational procedure for charging electrical vehicles, in accordance with the present disclosure. The operational procedure may be implemented in a system comprising one or more computing devices. Referring to FIG. 5, operation 501 illustrates accessing, via a wireless carrier network, data indicative of geographic locations and charging capabilities of a plurality of devices embedded in a roadway infrastructure. The roadway infrastructure may be configured to inductively charge electrical vehicles while the electrical vehicles are traversing the roadway infrastructure.

Operation 501 may be followed by operation 503. Operation 503 illustrates receiving, via the wireless carrier network, location tracking information for an electrical vehicle and a probable travel path of the electrical vehicle on the roadway infrastructure. The location tracking information may include, for example, GPS location information, mapping data, and other location information. The probable travel path may include a current velocity, currently programmed destination and routing information from a mapping application, and the like.

Operation 503 may be followed by operation 505. Operation 505 illustrates receiving, from a charging application executing on a computing device, data indicative of one or more charging settings for inductively charging the electrical vehicle while the electrical vehicle is traversing the roadway infrastructure. The charging settings may indicate conditions during which the electrical vehicle should be charged.

Operation 505 may be followed by operation 507. Operation 507 illustrates receiving, from a network-based orchestrator, one or more instructions indicative of when and where to charge the electrical vehicle. The instructions may be based on the charging settings, a charging model, the location tracking information for the electrical vehicle, and charging capabilities of the plurality of embedded devices. The network-based orchestrator may be one or more applications that may run on one or more computing devices of the charging service provider or the wireless network carrier.

Operation 507 may be followed by operation 509. Operation 509 illustrates sending, via the wireless carrier network, the one or more instructions to the plurality of embedded devices to enable charging of the electrical vehicle based on the charging settings.

In an embodiment, the computing device may be a mobile device associated with an operator of the electrical vehicle. For example, the mobile device may be a smartphone that is present on the vehicle when the operator of the vehicle is driving the vehicle.

In an embodiment, the computing device may be coupled to one or more systems of the electrical vehicle. In one example, the computing device may be an on-board computing device installed on the electrical vehicle. The on-board computing device may be coupled to various on-board systems that may provide location information, battery information, and the like.

In an embodiment, the charging settings may be indicative of a desired minimum battery charge level, a charging rate threshold, and total cost threshold. The minimum battery charge level may indicate a percentage. The charging rate threshold may indicate a cost per unit charge that represents a maximum cost that the user is willing to pay. The total cost threshold may indicate a maximum total cost that the user is willing to pay for a given time period or a given charging session. The charging settings may also be indicative of a geographic location of the electrical vehicle.

In an embodiment, the one or more instructions are determined based in part on a planned destination of the electrical vehicle and availability of charging capacity in the roadway infrastructure associated with a programmed path to the planned destination In an embodiment, the network-based orchestrator may be executed by a charging service provider such as charging service provider 280 of FIG. 2.

FIG. 6 illustrates an example operational procedure for charging electrical vehicles, in accordance with the present disclosure. The operational procedure may be implemented in a system comprising one or more computing devices. Referring to FIG. 6, operation 601 illustrates determining location tracking information for an electrical vehicle and a probable travel path of the electrical vehicle on a roadway infrastructure. The roadway infrastructure may be configured to inductively charge electrical vehicles while the electrical vehicles are traversing the roadway infrastructure. The location tracking information may include, for example, GPS location information, mapping data, and other location information. The probable travel path may include a current velocity, currently programmed destination and routing information from a mapping application, and the like.

Operation 601 may be followed by operation 603. Operation 603 illustrates sending, to a charging service provider via a wireless carrier network, the location tracking information.

Operation 603 may be followed by operation 605. Operation 605 illustrates receiving, via a user interface of the computing device, data indicative of one or more charging settings for inductively charging the electrical vehicle while the electrical vehicle is traversing the roadway infrastructure. The charging settings may indicate conditions during which the electrical vehicle should be charged.

Operation 605 may be followed by operation 607. Operation 607 illustrates sending, to the charging service provider via the wireless carrier network, the data indicative of the one or more charging settings.

Operation 607 may be followed by operation 609. Operation 609 illustrates receiving, from the charging service provider via the wireless carrier network, data indicative of a charging plan for when and where the electrical vehicle is to be charged. The charging plan may be determined based on the charging settings, a charging model, the location tracking information for the electrical vehicle, and geographic locations and charging capabilities of a plurality of devices embedded in the roadway infrastructure.

In an embodiment, the computing device may be coupled to one or more systems of the electrical vehicle.

In an embodiment, the charging settings may be indicative of a desired minimum battery charge level, a charging rate threshold, and total cost threshold. In an embodiment, the charging settings are indicative of a geographic location of the electrical vehicle.

In an embodiment, the charging plan may be effected by one or more instructions that are determined based in part on a planned destination of the electrical vehicle and availability of charging capacity in the roadway infrastructure associated with a programmed path to the planned destination.

In an embodiment, the charging plan may be effected by a charging service provider.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of charging electrical vehicles, the method comprising:
   accessing, via a wireless carrier network, data indicative of geographic locations and charging capabilities of a plurality of devices embedded in a roadway infrastructure configured to charge electrical vehicles while the electrical vehicles are traversing the roadway infrastructure, wherein the plurality of devices embedded in the roadway infrastructure are configured to charge electrical vehicles using microwave energy;
   receiving, from a charging application executing on a mobile device associated with the wireless carrier network and with an operator of the electrical vehicle, data indicative of one or more charging settings for charging the electrical vehicle while the electrical vehicle is traversing the roadway infrastructure, the charging settings indicating conditions associated with charging the electrical vehicle and the data indicative of one or more charging settings including calendar data and location data associated with an upcoming event;
   sending, to the charging application executing on the mobile device associated with the wireless carrier network and with the operator of the electrical vehicle, a prompt to confirm an upcoming charging activity based at least in part on the calendar data and the location data associated with the upcoming event;
   receiving, from a network-based orchestrator implemented on a server device of the wireless carrier network or of a charging service provider, one or more instructions indicative of when and where to charge the electrical vehicle based on the charging settings, a charging model, the calendar data, the location data, and charging capabilities of the plurality of embedded devices; and
   sending, via the wireless carrier network and responsive to receiving the confirmation of the upcoming charging activity, the one or more instructions to the plurality of embedded devices to enable charging of the electrical vehicle based on the charging settings,
   wherein the mobile device and the electrical vehicle are separate and distinct from each other, and
   wherein the mobile device is communicatively coupled to the electrical vehicle.

2. The method of claim 1, further comprising:
   receiving, from the charging application executing on the mobile device associated with the wireless carrier network and with the operator of the electrical vehicle, a charging rule indicative of a condition under which charging is to take place;
   determining that the charging rule is invalid; and
   sending, to the charging application executing on the mobile device associated with the wireless carrier network and with the operator of the electrical vehicle, a warning associated with the charging rule.

3. The method of claim 2, wherein determining that the charging rule is invalid is based at least in part on determining that the charging rule conflicts with one or more criteria.

4. The method of claim 1, wherein the charging settings are indicative of a desired minimum battery charge level, a charging rate threshold, and total cost threshold.

5. The method of claim 1, wherein the charging settings are indicative of a geographic location of the electrical vehicle.

6. The method of claim 1, wherein the one or more instructions are determined based in part on a planned destination of the electrical vehicle and availability of charging capacity in the roadway infrastructure associated with a programmed path to the planned destination.

7. The method of claim 1, further comprising:
   receiving, from the charging application executing on the mobile device associated with the wireless carrier network and with the operator of the electrical vehicle, one or more charging rules indicative of conditions under which charging is to take place; and
   wherein sending the one or more instructions to the plurality of embedded devices to enable charging of the electrical vehicle is based at least in part on the charging rules.

8. A computing device comprising:
   one or more processors;
   a memory in communication with the one or more processors, the memory having computer-readable instructions stored thereupon which, when executed by the one or more processors, cause the computing device to implement a network-based orchestrator to perform operations comprising:
     receiving data indicative of geographic locations and charging capabilities of a plurality of devices embedded in a roadway infrastructure configured to inductively charge electrical vehicles while the electrical vehicles are traversing the roadway infrastructure;
     receiving, from a charging application executing a mobile device associated with a wireless carrier network and with an operator of an electrical vehicle, data indicative of one or more charging settings for inductively charging the electrical vehicle while the electrical vehicle is traversing the roadway infrastructure, wherein the charging settings indicate conditions associated with charging the electrical vehicle and the data indicative of one or more charging settings including calendar data and location information associated with an upcoming event;
     sending, to the charging application executing on the mobile device associated with the wireless carrier network and with the operator of the electrical vehicle, a prompt to confirm an upcoming charging activity based at least in part on the calendar data and the location information associated with the upcoming event;
     generating one or more instructions for charging indicative of when and where to charge the electrical vehicle using the devices embedded in the roadway infrastructure, the instructions generated based on the charging settings, a charging model, the calendar data, the location information, and charging capabilities of the plurality of embedded devices; and
     sending the one or more instructions to the plurality of embedded devices to enable charging of the electrical vehicle based on the charging settings,
     wherein the computing device is a server device of a wireless carrier network or of a charging service provider and is separate and distinct from the mobile device, and
     wherein the mobile device and electric vehicle are separate and distinct from each other but are communicatively coupled to each other.

9. The computing device of claim 8, wherein the operations further comprise:
- sending, to a network-based orchestrator of a charging service provider via a wireless carrier network, location tracking information;
- receiving, via a user interface of the computing device, data indicative of one or more charging rules indicative of conditions under which charging is to take place, the charging rules associated with charging the electrical vehicle;
- determining that the charging rule of the one or more charging rules is invalid; and
- sending, to the user interface of the computing device, a warning associated with the charging rule; and
- sending, to the network-based orchestrator of the charging service provider via the wireless carrier network, the data indicative of the one or more charging rules.

10. The computing device of claim 8, the operations further comprise:
- determining that a charging setting of the one or more charging settings is invalid; and
- sending, to a user interface of the computing device, a warning associated with the charging setting.

11. The computing device of claim 8, wherein the charging settings are indicative of a desired minimum battery charge level, a charging rate threshold, and total cost threshold.

12. The computing device of claim 8, wherein the operations further comprise:
- receiving, from the charging application executing on the mobile device associated with the wireless carrier network and with the operator of the electrical vehicle, one or more charging rules indicative of conditions under which charging is to take place; and
- wherein sending the one or more instructions to the plurality of embedded devices to enable charging of the electrical vehicle is based at least in part on the charging rules.

13. The computing device of claim 8, wherein the one or more instructions are determined based in part on a planned destination of the electrical vehicle and availability of charging capacity in the roadway infrastructure associated with a programmed path to the planned destination.

14. A non-transitory computer-readable medium including computer-executable instructions that, if executed by a computing device, cause the computing device to perform operations comprising:
- accessing, via a wireless carrier network, data indicative of geographic locations and charging capabilities of a plurality of devices embedded in a roadway infrastructure configured to charge electrical vehicles while the electrical vehicles are traversing the roadway infrastructure, wherein the plurality of devices embedded in the roadway infrastructure are configured to charge electrical vehicles using microwave energy;
- determining data indicative of one or more charging settings for charging an electrical vehicle, the data indicative of charging settings indicating conditions associated with charging the electrical vehicle and including calendar data and location tracking information associated with an upcoming event;
- sending, to a charging application executing on a mobile device associated with the wireless carrier network and with the operator of the electrical vehicle, a prompt to confirm an upcoming charging activity based at least in part on the calendar data and the location tracking information; and
- receiving, from a network-based orchestrator of a charging service provider via the wireless carrier network, data indicative of a charging plan for when and where the electrical vehicle is to be charged, the charging plan determined based on the charging rules, a charging model, the calendar data, the location tracking information for the electrical vehicle, and geographic locations and charging capabilities of a plurality of devices embedded in the roadway infrastructure,
- wherein the computing device is a mobile device that is communicatively coupled to the electrical vehicle, is associated with an operator of the electrical vehicle, and is separate and distinct from both a device implementing the network-based orchestrator and from the electrical vehicle.

15. The non-transitory computer-readable medium of claim 14, wherein the operations further comprise:
- sending, to a network-based orchestrator of a charging service provider via a wireless carrier network, the location tracking information; and
- receiving, via a user interface of the computing device, data indicative of one or more charging rules indicative of conditions under which charging is to take place, the charging rules associated with charging the electrical vehicle.

16. The non-transitory computer-readable medium of claim 15, wherein the operations further comprise:
- determining that the charging rule of the one or more charging rules is invalid; and
- sending, to the user interface of the computing device, a warning associated with the charging rule; and
- sending, to the network-based orchestrator of the charging service provider via the wireless carrier network, the data indicative of the one or more charging rules.

17. The non-transitory computer-readable medium of claim 14, wherein the charging rules are indicative of a desired minimum battery charge level, a charging rate threshold, and total cost threshold.

18. The non-transitory computer-readable medium of claim 14, wherein the charging rules are indicative of a geographic location of the electrical vehicle.

19. The non-transitory computer-readable medium of claim 14, wherein the charging plan is effected by one or more instructions that are determined based in part on a planned destination of the electrical vehicle and availability of charging capacity in the roadway infrastructure associated with a programmed path to the planned destination.

20. The non-transitory computer-readable medium of claim 14, wherein the charging plan is effected by a charging service provider.

* * * * *